United States Patent
Chen et al.

(10) Patent No.: US 10,742,245 B1
(45) Date of Patent: Aug. 11, 2020

(54) RECEIVER, TRANSMITTER AND CORRECTION CIRCUIT THEREOF

(71) Applicant: REALTEK SEMICONDUCTOR CORPORATION, Hsinchu (TW)

(72) Inventors: Beng-Meng Chen, Kaohsiung (TW); Chien-Jung Huang, Kaohsiung (TW); Yi-Hua Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/711,490

(22) Filed: Dec. 12, 2019

(30) Foreign Application Priority Data

Feb. 26, 2019 (TW) .............................. 108106409 A

(51) Int. Cl.
*H04B 1/10* (2006.01)
*H04L 25/03* (2006.01)

(52) U.S. Cl.
CPC ........... *H04B 1/1027* (2013.01); *H04L 25/03* (2013.01)

(58) Field of Classification Search
CPC .............................. H04B 1/1027; H04L 25/03
USPC .......................................................... 375/349
See application file for complete search history.

(56) References Cited

U.S. PATENT DOCUMENTS

| 8,280,327 B2 | 10/2012 | Hsu et al. | |
| 10,116,485 B1 * | 10/2018 | Liu | H04B 17/17 |
| 10,469,036 B2 | 11/2019 | Benjamin et al. | |
| 2004/0106380 A1 * | 6/2004 | Vassiliou | H04B 17/20 455/73 |
| 2010/0313094 A1 * | 12/2010 | Kubota | H04L 27/3863 714/746 |
| 2012/0257656 A1 * | 10/2012 | Kang | H04B 1/525 375/221 |

OTHER PUBLICATIONS

OA letter of the counterpart TW application (appl. No. 108106409) mailed on Dec. 25, 2019. Summary of the OA letter: reference 1(US10469036) renders claims 1-2 and 4-5 obvious.

* cited by examiner

*Primary Examiner* — Don N Vo
(74) *Attorney, Agent, or Firm* — WPAT, PC

(57) ABSTRACT

A device includes a baseband circuit that generates a first digital signal, a digital-to-analog converter (DAC) that converts the first digital signal into a baseband signal, a first mixer that generates a first mixed signal based on the baseband signal and a first reference signal, a second mixer that generates a second mixed signal based on the baseband signal and a second reference signal, a third mixer that generates a down-converted signal based on the first mixed signal and the second mixed signal, and an analog-to-digital converter (ADC) that converts the down-converted signal into a second digital signal. The frequency of the first reference signal is different from the frequency of the second reference signal.

6 Claims, 4 Drawing Sheets

RECEIVER, TRANSMITTER AND CORRECTION CIRCUIT THEREOF

BACKGROUND OF THE INVENTION

1. Field of the Invention

The present invention relates to wireless communications, and, more particularly, to receivers, transmitters, and correction circuits thereof.

2. Description of Related Art

FIG. 1 is a functional block diagram of a conventional transceiver. The baseband circuit 110 processes baseband signals and may include logic circuits such as a central processing unit (CPU), a microprocessor, a microcontroller or a digital signal processor (DSP). The digital-to-analog converter (DAC) 120 converts the digital signal SD generated by the baseband circuit 110 into a baseband signal SA-T. The baseband amplifier 130 amplifies the baseband signal SA-T to generate an amplified baseband signal SA-T'. The baseband amplifier 130 may also be capable of filtering out certain frequency components of the baseband signal SA-T. The mixer 140 mixes the amplified baseband signal SA-T' with the reference signal LO to generate the mixed signal SF. The power amplifier (PA) 150 amplifies the mixed signal SF to generate an amplified mixed signal SF'. The amplified mixed signal SF' can be transmitted via an antenna (not shown). The mixer 160 mixes the amplified mixed signal SF' with itself to generate a down-converted signal SA-R. After being amplified by the programmable gain amplifier (PGA) 170, the down-converted signal SA-R becomes the amplified down-converted signal SA-R'. The analog-to-digital converter (ADC) 180 converts the amplified down-converted signal SA-R' into the digital signal ST.

Non-ideal circuits (such as circuits with poor linearity) may cause in-phase/quadrature-phase mismatch (I/Q mismatch) in the mixed signal SF or the amplified mixed signal SF', and the baseband circuit 110 corrects the I/Q mismatch (i.e., improving the linearity of the circuit) based on the following principles. Assuming that the frequency of the baseband signal SA-T is $f_B$, when the circuit is not ideal, the mixed signal SF and the amplified mixed signal SF' may contain the following frequency components: $f_{LO}-f_B$, $f_{LO}$ and $f_{LO}+f_B$, where $f_{LO}$ is the frequency of the reference signal LO, $f_{LO}+f_B$ is the signal component and $f_{LO}-f_B$ is the image component. The image component is caused by a nonlinear circuit. The down-converted signal SA-R and the amplified down-converted signal SA-R' may contain the following frequency components: zero frequency (i.e., direct current (DC) component), baseband (i.e., $f_B$) and second harmonic generation (SHG) (i.e., $2f_B$). The baseband circuit 110 can know the power of each frequency component by analyzing the digital signal ST. Because the SHG component is a mixture of the signal component and the image component, the linearity of the circuit can be improved (i.e., mismatch between the in-phase/quadrature-phase of the signal can be corrected) by simply adjusting the circuit to decrease the SHG component. Unfortunately, the baseband component and the SHG component of the baseband signal SA-T and/or the amplified baseband signal SA-T' may be directly coupled to the input of the ADC 180 through signal coupling (e.g., indicated by the dashed line 190), causing misjudgment of the baseband circuit 110.

SUMMARY OF THE INVENTION

In view of the issues of the prior art, an object of the present invention is to provide a receiver, a transmitter and a correction circuit thereof, so as to make an improvement to the prior art.

A device is provided. The device includes a baseband circuit, a digital-to-analog converter (DAC), a first mixer, a second mixer, a third mixer and an analog-to-digital converter (ADC). The baseband circuit is configured to generate a first digital signal. The DAC is coupled to the baseband circuit and configured to convert the first digital signal into a baseband signal. The first mixer is coupled to the DAC and configured to generate a first mixed signal based on the baseband signal and a first reference signal. The second mixer is coupled to the DAC and configured to generate a second mixed signal based on the baseband signal and a second reference signal. The third mixer is coupled to the first mixer and the second mixer and configured to generate a down-converted signal based on the first mixed signal and the second mixed signal. The ADC is coupled to the third mixer and the baseband circuit and configured to convert the down-converted signal into a second digital signal. A frequency of the first reference signal is different from a frequency of the second reference signal.

A device is also provided. The device includes a baseband circuit, a digital-to-analog converter (DAC), a first mixer, a low noise amplifier, a second mixer, a third mixer and an analog-to-digital converter (ADC). The baseband circuit is configured to generate a first digital signal. The DAC is coupled to the baseband circuit and configured to convert the first digital signal into a baseband signal. The first mixer is coupled to the DAC and configured to generate a first mixed signal based on the baseband signal and a first reference signal. The low noise amplifier is configured to receive the first mixed signal through signal coupling and to amplify the first mixed signal to generate an amplified mixed signal. The second mixer is coupled to the DAC and configured to generate a second mixed signal based on the baseband signal and a second reference signal. The third mixer is coupled to the low noise amplifier and the second mixer and configured to generate a down-converted signal based on the amplified mixed signal and the second mixed signal. The ADC is coupled to the third mixer and the baseband circuit and configured to convert the down-converted signal into a second digital signal. A frequency of the first reference signal is different from a frequency of the second reference signal.

According to this invention, the receiver, transmitter and correction circuit thereof prevent interferences caused by signal coupling within the circuit from occurring. Compared with the conventional technology, the present invention can correct the circuit more accurately to improve the linearity of the circuit, thereby reducing signal distortion and enhancing signal quality.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a receiver, a transmitter and a correction circuit thereof. On account of that some or all elements of the receiver, transmitter and correction circuit thereof could be known, the detail of such elements is omitted provided that such detail has little to do with the features of this disclosure, and that this omission nowhere dissatisfies the specification and enablement requirements. A person having ordinary skill in the art can choose components equivalent to those described in this specification to carry out the present invention, which means that the scope of this invention is not limited to the embodiments in the specification.

Figure 1:
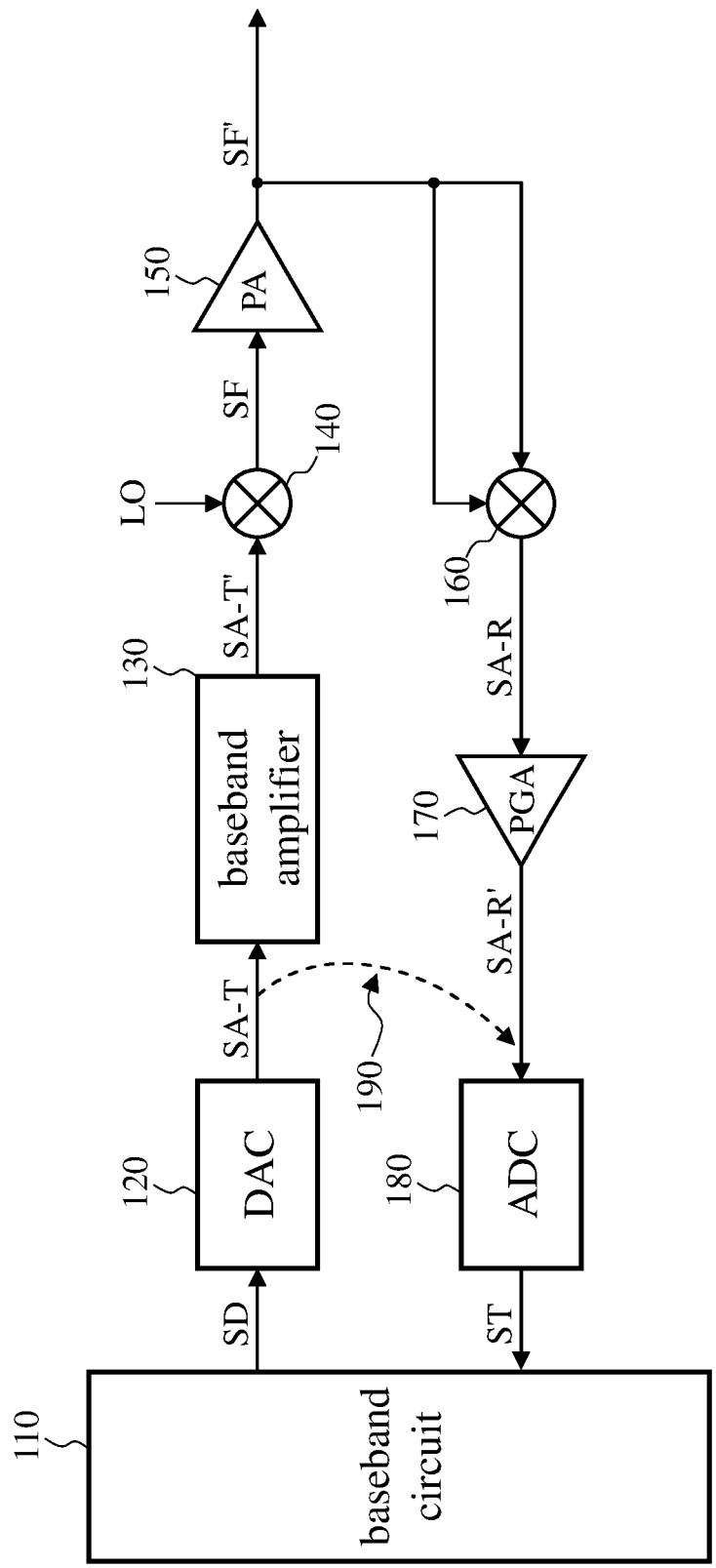
FIG. 1 illustrates a functional block diagram of a conventional transceiver.
Figure 2:
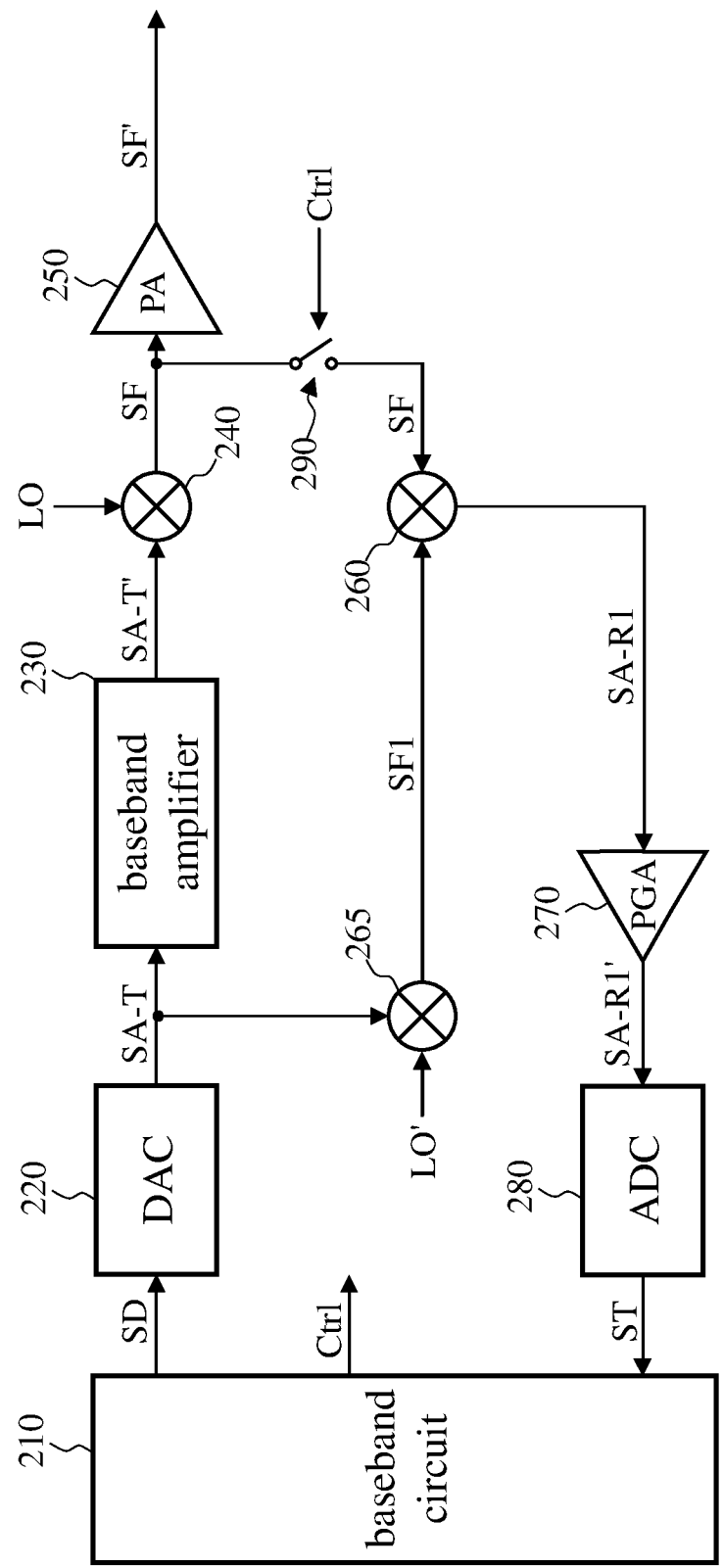
FIG. 2 illustrates a functional block diagram of a device in accordance with an embodiment of the present invention.

FIG. 2 shows a functional block diagram of a device in accordance with an embodiment of the present invention, and the device includes a transmitter and a correction circuit. Because the functions of the components 210, 220, 230, 240, 250, 270 and 280 are similar to those of the components 110, 120, 130, 140, 150, 170 and 180, respectively, the operation details of the components 210, 220, 230, 240, 250, 270 and 280 are omitted for brevity. The transmitter includes the DAC 220, the baseband amplifier 230, the mixer 240 and the power amplifier (PA) 250. The correction circuit includes the baseband circuit 210, the mixer 260, the mixer 265, the programmable gain amplifier (PGA) 270, the ADC 280 and the switch 290. The device in FIG. 2 can operate in a working mode or a correction mode. In the working mode, the baseband circuit 210 switches off the switch 290 by issuing the control signal Ctrl and selectively switches off or does not supply power to the mixer 260, the mixer 265, the PGA 270 and the ADC 280. In the working mode, the digital signal SD generated by the baseband circuit 210 is processed by the components on the signal transmission path which includes the DAC 220, the baseband amplifier 230, the mixer 240 and the PA 250 to form the amplified mixed signal SF' which is then transmitted through an antenna (not shown). In the correction mode, the baseband circuit 210 controls the switch 290 to switch on and activates or supplies power to the mixer 260, the mixer 265, the PGA 270 and the ADC 280. The mixer 265 is configured to mix the baseband signal SA-T with the reference signal LO' to generate the mixed signal SF1. In other words, the mixed signal SF1 is generated by the mixer 265 based on the baseband signal SA-T and the reference signal LO'. The mixer 260 is configured to mix the mixed signal SF with the mixed signal SF1 to generate the down-converted signal SA-R1. The frequency of the reference signal LO is different from the frequency of the reference signal LO'. In some embodiments, the difference between the frequency of the reference signal LO and the frequency of the reference signal LO' is less than 80 MHz. Because Wi-Fi currently supports a maximum bandwidth of 160 MHz in the radio frequency (RF) band, and to down-convert the signal to the baseband requires an ability to accurately analyze a bandwidth not greater than 80 MHz, the difference is set to less than 80 MHz to directly meet the requirement that the original circuit is within a frequency range in which the baseband signals can definitely be analyzed.

Note that because the mixed signal SF and the amplified mixed signal SF' are different in amplitude only, in some embodiments, the mixer 260 may mix the amplified mixed signal SF', instead of the mixed signal SF, with the mixed signal SF1. In this instance, the mixer 260 is coupled to the output of the PA 250 via the switch 290. In other embodiments, the PA 250 can be an amplifier that includes multiple stages of amplifier circuits; in this instance, the signal inputted to the mixer 260 can be the output signal of any stage of the amplifier circuits of the PA 250. In some embodiments, a signal attenuator or signal amplifier can be connected in series between the switch 290 and the mixer 260 depending on the practical amplitude of the mixed signal SF or the amplified mixed signal SF'.

Assuming that the frequency of the reference signal LO is still $f_{LO}$, the mixed signal SF or the amplified mixed signal SF may include the following frequency components: $f_{LO}-f_B$ (the image component), $f_{LO}+f_B$ (the signal component) and $f_{LO}$. If the frequency of the reference signal LO' is $f_{LOP}$, the mixed signal SF1 may include the following frequency components: $f_{LOP}+f_B$ and $f_{LOP}$. After the mixed signal SF (or the amplified mixed signal SF') and the mixed signal SF1 are mixed by the mixer 260, the down-converted signal SA-R1 includes the following frequency components: $f_{LO}-f_{LOP}$, $f_{LO}-f_{LOP}-f_B$ and $f_{LO}-f_{LOP}-2f_B$. As long as the amplitude of the frequency component $f_{LO}-f_{LOP}-2f_B$ is reduced (for example, by adjusting the circuit), the linearity of the circuit can be improved. Observe that since $f_{LO}$ is not equal to $f_{LOP}$, the frequency component $f_{LO}-f_{LOP}-2f_B$ is not equal to SHG (i.e., $2f_B$). As a result, even though there is a non-ideal signal coupling from the baseband signal SA-T and/or the amplified baseband signal SA-T', the baseband circuit 210 can smoothly correct the linearity of the circuit.

Figure 3:
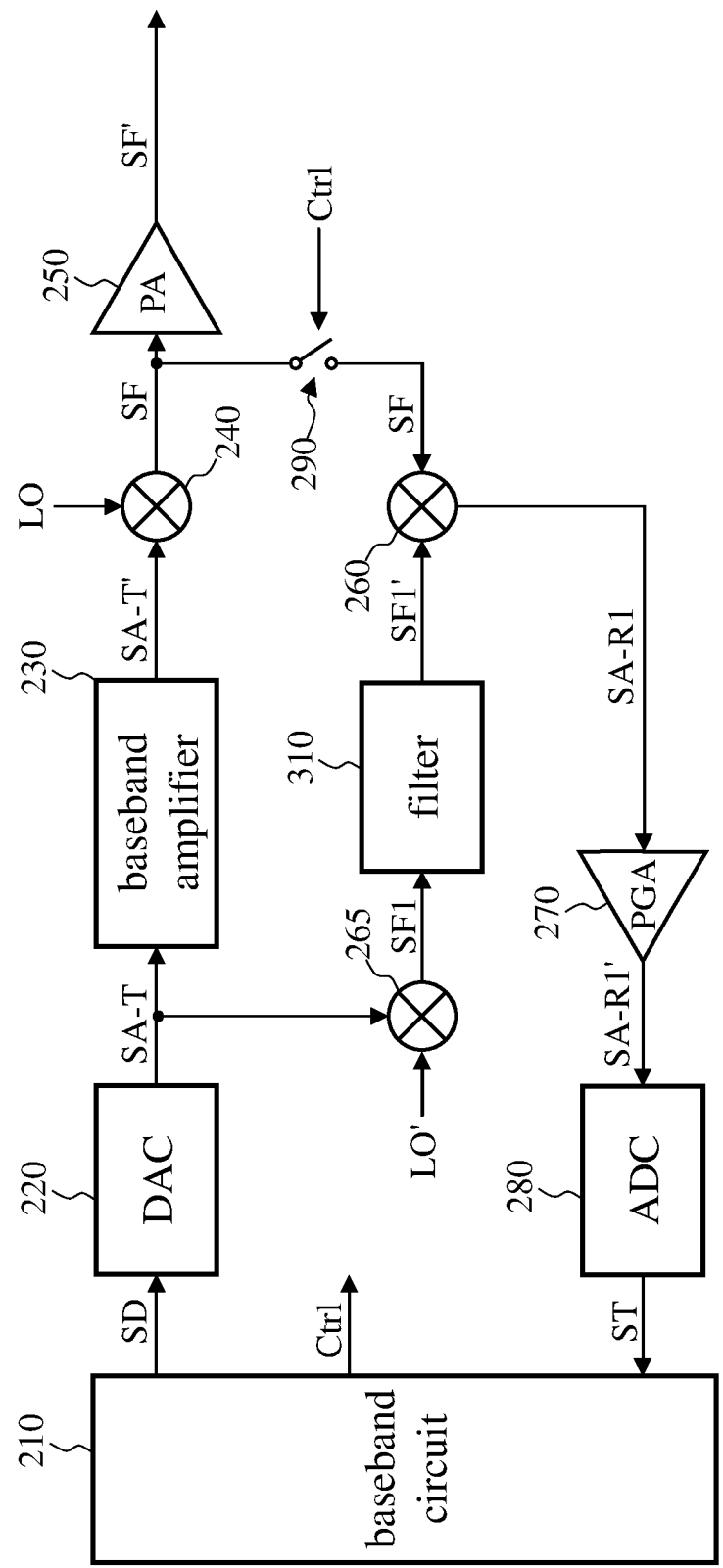
FIG. 3 illustrates a functional block diagram of a device in accordance with another embodiment of the present invention.

FIG. 3 shows a functional block diagram of a device in accordance with another embodiment of the present invention, and the device includes a transmitter and a correction circuit. The device in FIG. 3 is similar to the device in FIG. 2, except that the device in FIG. 3 further includes a filter 310 (e.g., a bandpass filter) coupled between the mixer 260 and the mixer 265 for filtering out the low frequency component of the mixed signal SF1 (i.e., filtering out the frequency component $f_{LOP}$), such that the filtered mixed signal SF1' ideally contains only the frequency component $f_{LOP}+f_B$. Filtering out the low frequency component of the mixed signal SF1 can make the frequency component of the down-converted signal SA-R1 simple, facilitating the analysis and judgement of the baseband circuit 210. Since the filtered mixed signal SF1' and the mixed signal SF1 both include the frequency component $f_{LOP}+f_B$, mixing the mixed signal SF with the filtered mixed signal SF1' can achieve the same purpose as mixing the mixed signal SF with the mixed signal SF1. In other words, the mixer 260 can perform a mixing operation based on or according to the filtered mixed signal SF1' or the mixed signal SF1.

Figure 4:
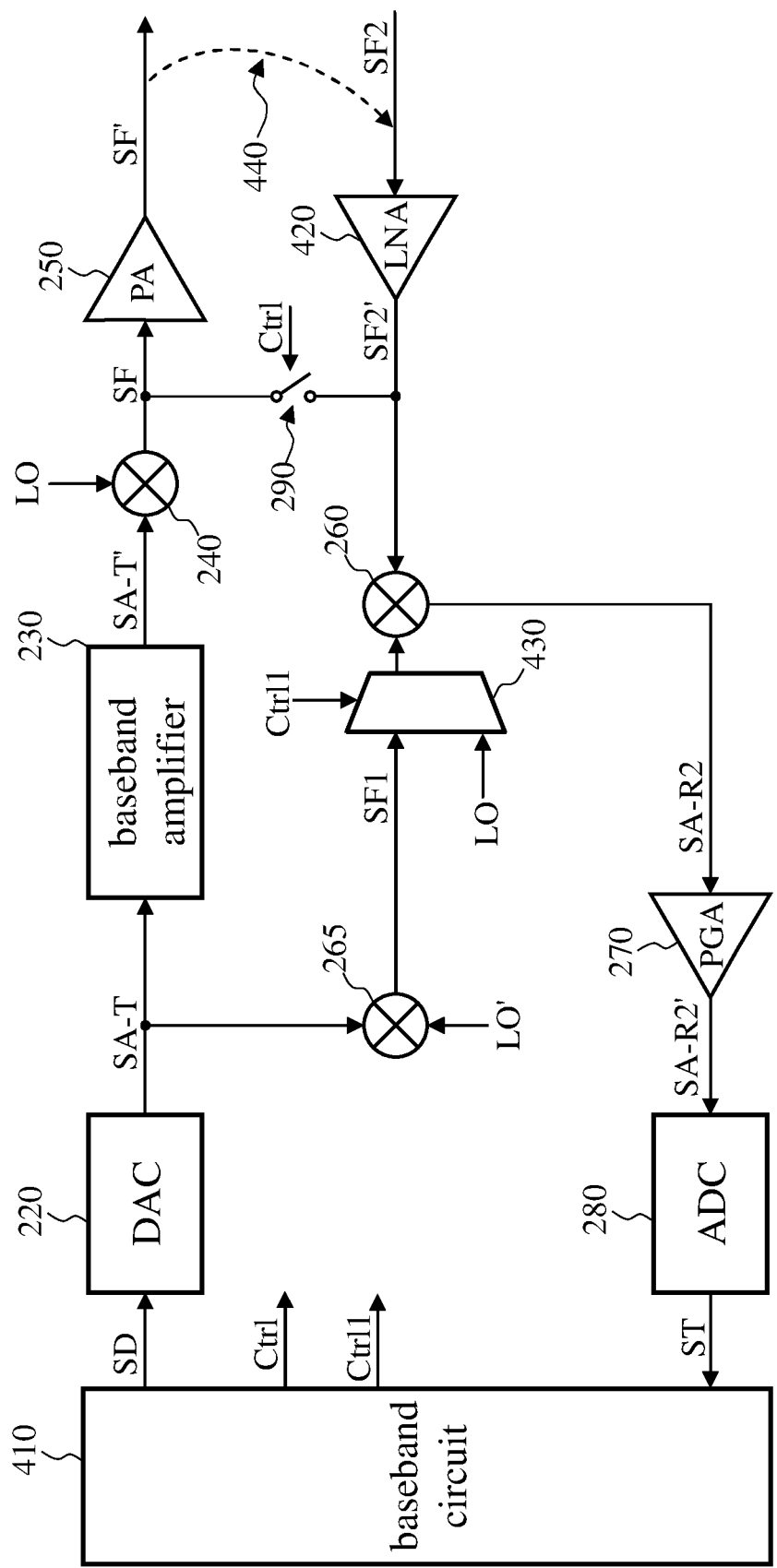
FIG. 4 illustrates a functional block diagram of a device in accordance with another embodiment of the present invention.

FIG. 4 shows a functional block diagram of a device in accordance with another embodiment of the present invention, and the device includes a transmitter, a receiver and a correction circuit. The transmitter includes the DAC 220, the baseband amplifier 230, the mixer 240 and the PA 250. The receiver includes a low noise amplifier (LNA) 420, the mixer 260, the PGA 270 and the ADC 280. The correction circuit includes a baseband circuit 410, the mixer 260, the mixer 265, the PGA 270, the ADC 280 and the switch 290. The device in FIG. 4 can operate in a working mode or a correction mode. By issuing the control signal Ctrl1, the baseband circuit 410 controls the multiplexer 430 to select the reference signal LO in the working mode and the mixed signal SF1 in the correction mode Similarly, in some embodiments, a filter connected in series between the mixer 265 and the multiplexer 430 may be provided to filter out the low frequency component of the mixed signal SF1.

In the working mode, the LNA 420 amplifies the RF signal SF2 transmitted from a signal transmitting end, the mixer 260 mixes the reference signal LO with the signal SF2' (in this instance, the signal SF2' is an amplified signal of the RF signal SF2) to generate a down-converted signal SA-R2, the PGA 270 amplifies the down-converted signal SA-R2 to generate the amplified down-converted signal SA-R2', and finally the ADC 280 converts the amplified down-converted signal SA-R2' into the digital signal ST.

The transmitter and receiver can be corrected in the correction mode. In the correction of the transmitter, the baseband circuit 410 controls the switch 290 to switch on and switches off or disables the LNA 420. The operations of correcting the transmitter are discussed in detail in the embodiment of FIG. 2 and are thus omitted for brevity. In the correction of the receiver, the baseband circuit 410 controls the switch 290 to switch off and activates on or enables other components, and the amplified mixed signal SF' transmitted out by the transmitter is coupled to the input of the LNA 420 through signal coupling (indicated by the dashed line 440). Since the amplified mixed signal SF contains the frequency component $f_{LO}$, the RF signal SF2 also contains the frequency component $f_{LO}$ in the correction mode. Furthermore, because the mixer 260 mixes the mixed signal SF1 (instead of the reference signal LO) with the signal SF2' in the correction mode (in this instance, the signal SF2' is an amplified signal of the RF signal SF2 and is also equivalent to the amplified mixed signal SF or the mixed signal SF), the down-converted signal SA-R2 does not contain the baseband component and the SHG component of the baseband signal SA-T and/or the amplified baseband signal SA-T'. In this way, the correction of the receiver is not affected by the non-ideal signal coupling from the baseband signal SA-T and/or the amplified baseband signal SA-T'.

In the above disclosure, since, ideally, the amplified baseband signal SA-T' and the baseband signal SA-T are different in amplitude only, operations (such as mixing, analog-to-digital conversion, amplification, signal coupling, etc.) based on or according to one of these two signals are substantially equivalent to the operations based on or according to the other. The same concept can be applied to the signal pairs (SF, SF'), (SA-R1, SA-R1'), (SF2, SF2'), and (SA-R2, SA-R2').

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A device, comprising:
    a baseband circuit configured to generate a first digital signal;
    a digital-to-analog converter (DAC) coupled to the baseband circuit and configured to convert the first digital signal into a baseband signal;
    a first mixer coupled to the DAC and configured to generate a first mixed signal based on the baseband signal and a first reference signal;
    a second mixer coupled to the DAC and configured to generate a second mixed signal based on the baseband signal and a second reference signal;
    a third mixer coupled to the first mixer and the second mixer and configured to generate a down-converted signal based on the first mixed signal and the second mixed signal; and
    an analog-to-digital converter (ADC) coupled to the third mixer and the baseband circuit and configured to convert the down-converted signal into a second digital signal;
    wherein a frequency of the first reference signal is different from a frequency of the second reference signal.

2. The device of claim 1 further comprising:
    a filter coupled to the second mixer and configured to filter out a low frequency component of the second mixed signal.

3. The device of claim 1, wherein a difference between a frequency of the first reference signal and a frequency of the second reference signal is less than 80 MHz.

4. A device, comprising:
    a baseband circuit configured to generate a first digital signal;
    a digital-to-analog converter (DAC) coupled to the baseband circuit and configured to convert the first digital signal into a baseband signal;
    a first mixer coupled to the DAC and configured to generate a first mixed signal based on the baseband signal and a first reference signal;
    a low noise amplifier configured to receive the first mixed signal through signal coupling and to amplify the first mixed signal to generate an amplified mixed signal;
    a second mixer coupled to the DAC and configured to generate a second mixed signal based on the baseband signal and a second reference signal;
    a third mixer coupled to the low noise amplifier and the second mixer and configured to generate a down-converted signal based on the amplified mixed signal and the second mixed signal; and
    an analog-to-digital converter (ADC) coupled to the third mixer and the baseband circuit and configured to convert the down-converted signal into a second digital signal;
    wherein a frequency of the first reference signal is different from a frequency of the second reference signal.

5. The device of claim 4 further comprising:
    a filter coupled to the second mixer and configured to filter out a low frequency component of the second mixed signal.

6. The device of claim 4, wherein a difference between a frequency of the first reference signal and a frequency of the second reference signal is less than 80 MHz.

\* \* \* \* \*